C. F. Cosfeldt, Jr.,
Steam-Boiler Indicator,
No. 70,807. Patented Nov. 12, 1867.
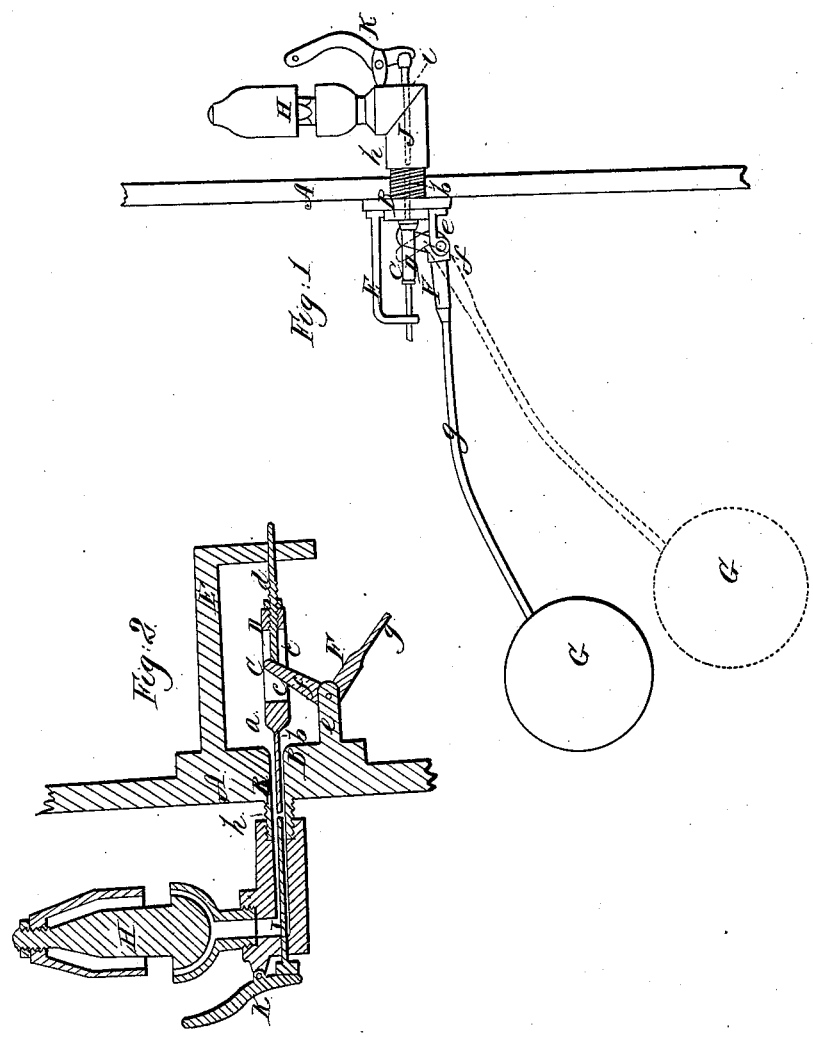
Witnesses:
Inventor

United States Patent Office.

CLEMOIRE F. COSFELDT, JR., OF PHILADELPHIA, PENNSYLVANIA.

Letters Patent No. 70,807, dated November 12, 1867.

IMPROVEMENT IN LOW-WATER DETECTORS.

*The Schedule referred to in these Letters Patent and making part of the same.*

TO ALL WHOM IT MAY CONCERN:

Be it known that I, CLEMOIRE F. COSFELDT, Jr., of the city and county of Philadelphia, and State of Pennsylvania, have invented a new and useful Low-Water Detector and Time-Whistle combined; and I do hereby declare the following to be a clear and exact description of the same, sufficient to enable others skilled in the art to which my invention appertains to fully understand and use the same, reference being had to the accompanying drawings, making part of this specification, in which—

Figure 1 is a side elevation of the device, illustrating my invention, and

Figure 2 is a central longitudinal vertical section thereof.

Similar letters of reference indicate corresponding parts in the two figures.

My invention is a low-water detector and time-whistle, and consists of the application within a boiler of a valve in a horizontal position, with a corresponding seat, said valve being operated by a swinging lever having at one end a float, and an arm placed at an angle at the other end, so that said arm, protruding through a slot in the body or stem of the valve, will enable the float-lever to vibrate to a certain extent, thereby compensating for the ebullition or vibration of the water. I adapt the device to a time-whistle by means of a rod and lever, which are readily operated without interfering with the other parts, all as will be hereinafter more fully described.

In the drawings, A represents the boiler-head, through a certain point of which protrudes the valve-seat B, having an opening, a, passing entirely through it. C is the valve, of ordinary form, placed within the boiler, and sliding or dropping horizontally against its seat B, likewise within the boiler, and has its shank $b$ to enter and move in the opening $a$. D is the valve-stem, through which is cut a vertical longitudinal slot, $c$. The inner end of the valve has a hole provided with thread, into which fits a screw, $d$, having a jam-nut thereon, the plain part of which acts as a guide-stem for the valve. One end of this screw-rod projects longitudinally into the slot $c$, and its plain end passes through a bearing in a right-angular arm or support, E, which projects inwardly within the boiler, and is secured at the top of the valve-seat B, or in any equivalent manner. From the under side of the valve-seat there arises a hinge or arms, $e$, having ears or lugs, on which is pivoted a pin or bolt and nut, carrying an angular lever, F, and forming the fulcrum of said lever. The short arm $f$ points upwardly, and protrudes through the slot $c$, and, being of smaller dimensions than the slot, has a certain play therein. The long arm or lever $g$ projects inwardly, and carries a float, G, of usual construction. It will be perceived that when the boiler is properly filled with water, the continual tendency of the float is to rise, thereby carry the lever $g$, and push forward the short arm $f$ in the slot $c$ against the valve, and thus force the valve on the seat. When sufficient steam is generated, it will take the place of the float and lever. The valve is then retained on its seat by the pressure of the steam. It will be noticed that during this time the ebullition or vibration of the water will cause a corresponding vibration of the float and lever, and unless some provision is made therefor, the position of the valve would be continually affected. Steam will escape from the boiler and rush out against the whistle in short and loud puffs.

My invention is intended to obviate this great annoyance. The slot $c$ in the stem of the valve allows a limited vibration of the short arm of the float-lever, and therefore the valve remains unmoved against its seat. When it is desired to regulate the extent of the free vibration of the levers according to the intended height of water in the boiler, the screw and jam-nut are the regulating media. To decrease or increase the vibration, the rod must be drawn further from or brought nearer to the short arm $f$, and held in position by the jam-nut. When the water decreases in quantity by evaporation or leakage, or other causes, the float will follow or fall in a corresponding ratio. When the float reaches the point or depth of water decided upon to insure safety, the short arm $f$ of the lever will come in contact with the end of screw $d$; it will drag the valve from its seat, allow the escape of steam, and cause the whistle to give the alarm. The projecting part $h$ of the valve-seat protrudes through the boiler-head, being sufficiently long to enable it to be screwed into said head and held in position by a jam-nut or any other steam-tight joint. Attached to the outer end of the projecting part $h$ is an elbow, on which is placed an ordinary steam-whistle, H. At a point, $i$, in elbow, is an opening through which passes a rod, J, whose inner end comes in contact with the shank of the valve when it is desired to use my device as a time-whistle. I place, at any suitable point on the elbow, ears or lugs, forming a fulcrum for a lever, K, whereby the rod J can be pressed against the end of shank of the valve, and thus release the valve from its seat, permitting the escape of steam to the whistle. It will be noticed that the rod J and valve D' are separate. The latter cannot be closed by the former, but it depends, for this purpose, on the rise of the float, consequently no access can be had to the valve for surreptitiously closing the same.

My invention is practical, and can be adapted to any boiler capable of receiving a float, and whether locomotive, marine, or stationary. The valve, its seat, its regulating medium, and the float and its levers, are all arranged within the boiler, and are therefore out of the way, and are more effective than ordinarily. When my invention is applied to a boiler, it presents the appearance on the outside of nothing more than an ordinary steam-whistle. I consider the simplicity of my invention one of its great features. I also combine therewith durability and utility, and intend to supply a want generally and greatly felt, in view of the many accidents daily occurring. There are no means presented for the engineer or one in charge of the boiler to tamper with the whistle, so as to prevent its signalling when necessary. He may open the valve at pleasure, but it is beyond his power to close it, except by the admission of more water.

Having thus described my invention, what I claim as new, and desire to secure by Letters Patent, is—

1. The arrangement within the boiler of the valve-seat B, support E, and the independent slotted valve O D, having shank $b$ and rod $d$, as and for the purpose described.

2. The regulating-screw $d$, one end protruding through the slot $c$, and the other end resting on the support E, substantially as and for the purpose described.

To the above I have signed my name this 5th day of October, 1867.

CLEMOIRE F. COSFELDT, Jr.

Witnesses:
JOHN A. WIEDERSHEIM,
J. McKENNEY.